(12) United States Patent
Kliskey

(10) Patent No.: US 7,156,141 B1
(45) Date of Patent: Jan. 2, 2007

(54) TIRE DEMOUNTING TOOL

(75) Inventor: Roger Kliskey, Brimfield, OH (US)

(73) Assignee: Summit Tool Company, Akron, OH (US)

( * ) Notice: Subject to any disclaimer, the term of this patent is extended or adjusted under 35 U.S.C. 154(b) by 0 days.

(21) Appl. No.: 11/435,067

(22) Filed: May 16, 2006

(51) Int. Cl.
*B60C 25/02* (2006.01)

(52) U.S. Cl. .......................... 157/1.3; 157/1; 157/1.17; 254/120; D8/31

(58) Field of Classification Search .............. 157/1, 157/1.13, 1.17, 1.22; 254/120, 131; D8/31
See application file for complete search history.

(56) References Cited

U.S. PATENT DOCUMENTS

| | | | |
|---|---|---|---|
| 355,754 A | 1/1887 | Beck | |
| 834,908 A | 11/1906 | Hussey | |
| 951,200 A | 3/1910 | Pilliner | |
| 1,100,032 A * | 6/1914 | Speck | 157/1.3 |
| 1,567,025 A | 12/1925 | Allison | |
| 1,741,801 A | 12/1929 | White | |
| 1,829,804 A | 11/1931 | Loomis | 157/1.33 |
| 2,112,661 A | 3/1938 | Abrahams | |
| 2,188,211 A | 1/1940 | Tilson | |
| 2,226,757 A | 12/1940 | Ewell | |
| 2,294,271 A | 8/1942 | Bethard | |
| D134,799 S | 1/1943 | Taylor | D8/31 |
| 2,311,789 A | 2/1943 | Taylor | |
| 2,344,704 A * | 3/1944 | Krantz | 157/1.17 |
| D142,931 S | 11/1945 | Bailey | |
| 2,399,146 A | 4/1946 | Schumann | |
| D158,110 S | 4/1950 | Lutz | |
| 2,571,517 A | 10/1951 | Aycock | |
| 2,634,803 A | 4/1953 | Obee | |
| 2,712,350 A | 7/1955 | Henderson | |
| 3,164,197 A | 1/1965 | Bishman | |
| 3,584,672 A | 6/1971 | Duquesne | 157/1.3 |
| 3,717,193 A * | 2/1973 | Craft | 157/1.3 |
| 3,851,694 A * | 12/1974 | Brosene, Jr. | 157/1 |
| 3,908,728 A * | 9/1975 | DeMola | 157/1.22 |
| 4,133,363 A * | 1/1979 | Gardner | 157/1.3 |
| 4,436,134 A | 3/1984 | Gaither | 157/1.3 |
| 4,527,607 A | 7/1985 | Gaither | 157/1.3 |
| 4,738,294 A * | 4/1988 | Fosse | 157/1.22 |
| 4,919,184 A | 4/1990 | du Quesne | 157/1.3 |
| 5,123,470 A | 6/1992 | Tran | 157/1.3 |
| 5,143,134 A | 9/1992 | Tran | 157/1.3 |
| 5,213,146 A | 5/1993 | Onozawa | 157/1.3 |
| 5,265,661 A | 11/1993 | Tran | 157/1.3 |
| 5,343,921 A | 9/1994 | Kusner | 157/1.3 |
| 5,363,897 A | 11/1994 | Branch | 157/1.3 |
| 5,417,270 A | 5/1995 | Brunner | 157/1.3 |

(Continued)

OTHER PUBLICATIONS

J.C. Whitney & Co. 564J Catalog, p. 163 (1993).

(Continued)

*Primary Examiner*—Lee D. Wilson
*Assistant Examiner*—Anthony Ojini
(74) *Attorney, Agent, or Firm*—Renner, Kenner, Greive, Bobak, Taylor & Weber

(57) ABSTRACT

A tire demounting tool for demounting a second bead of a tire from a rim having a flange, the tire demounting tool including a handle; a head extending radially outward as it extends axially outward from the handle; a bill extending axially outward from the head, wherein the bill includes a tip insertable between the second bead and the rim and wherein the head extends radially outward relative to the bill to capture the second bead when the bill is inserted between the rim and the second bead.

16 Claims, 5 Drawing Sheets

U.S. PATENT DOCUMENTS

| | | | |
|---|---|---|---|
| 5,663,897 A * | 9/1997 | Geiser | 702/182 |
| 5,740,848 A | 4/1998 | Goracy | 157/1.3 |
| D395,809 S | 7/1998 | Brown | D8/31 |
| 5,806,578 A | 9/1998 | Gonzaga | 157/1.3 |
| D412,271 S | 7/1999 | Kliskey | D8/31 |
| 6,179,032 B1 | 1/2001 | Diez | 157/1.1 |
| 6,182,735 B1 | 2/2001 | du Quesne | 157/1.17 |
| 6,192,959 B1 | 2/2001 | Spaggiari | 157/1.28 |
| 6,488,266 B1 * | 12/2002 | Macor | 254/25 |
| D468,184 S * | 1/2003 | Macor | D8/89 |
| 6,588,479 B1 | 7/2003 | Kliskey | 157/1.3 |
| 6,712,114 B1 | 3/2004 | Kliskey | 157/1.3 |
| 6,913,061 B1 | 7/2005 | Kliskey | 157/1.3 |
| 2002/0144790 A1 * | 10/2002 | Spaggiari | 157/1.3 |

OTHER PUBLICATIONS

Myers Tire Supply Catalog, p. 71 (1999).

* cited by examiner

TIRE DEMOUNTING TOOL

TECHNICAL FIELD

The present invention relates generally to a tool for demounting a tire from a rim. More particularly, the present invention relates to a demounting tool used to demount the second bead of a tire from the rim.

BACKGROUND OF THE INVENTION

From time to time, pneumatic tires require repair or replacement. To service such tires, the tire must be removed from the wheel rim. A variety of tools have been developed and utilized to facilitate the working of tires. Such tools typically comprise an elongate bar having a handle and a working end adapted to be inserted between the tire bead and wheel rim. The working end of the tool frequently has a flattened or tapered portion to facilitate insertion of the working end between the tire bead and the wheel rim.

To utilize the implement, the tool working portion is inserted manually between the bead of the tire and its associate wheel rim. Thereafter, the user applies pressure on the handle and moves a portion of the working end into contact with the wheel rim, thereby establishing the wheel rim as a fulcrum and making a lever of the tool. Pressure upon the handle causes the tool working end to engage and move a segment of the tire bead inward and allows the tire bead to be stretched over the rim by moving the tool around the periphery of the tire. In more recent years, machines have been developed which rotate the tire in conjunction with the use of the tool to alleviate the need for moving the tool. While the prior art is replete with working tools, the basic design has not changed significantly over the years. Known designs, while working well to an extent, have proven less than satisfactory in providing an optimally functional tire working implement. Some known devices remove tubeless truck tires by using separate tools for each tire bead. A first working tool is inserted between the second tire bead and the wheel rim and leverages the second bead over the rim to complete removal of the tire.

To aid in the removal process, some designs incorporate a projection that extends from the bottom of the flattened portion to create additional leverage when engaged with the wheel rim. Projections, however, carry a disadvantage in that they contact the wheel rim at a single point. Other devices use rollers as the pivot point between the tool and wheel rim. Rollers are undesirable in use because they are prone to movement during the working process and such movement can reduce the mechanical advantage provided by the tool. Still other designs use a bend in the mounting tool working end to create a pivot point. A bend is advantageous to an extent, but, as with a projection, it provides only a single point of contact with the wheel rim. With only one point of contact, the tool is prone to rocking or slipping on the rim during the tire removal procedure. Rocking or slipping can dislodge the working tool and require the user to begin the working process anew. At best, rocking or slipping necessarily causes the user to exert additional effort and concentration to maintain the working tool in its proper position.

Known working tool designs for demounting a second bead comprise a straight tool having a tip that angles downwardly from the longitudinal plane of the tool. While a downward end creates a more efficient lever, the downwardly turned tip, however, makes insertion difficult and requires inserting the tip at a sideways angle to the bead. A user will typically insert the tip between the tire bead and the wheel rim, leading with a corner of the tip, and gradually working the remainder of the tip underneath. This process is time consuming, and requires significant effort.

Also, the straight design's range of motion is limited by contact with the tread of the tire. The tread is relatively stiff and does not compress when the tool is raised to the point of contacting the tread. As a result rotation of the tool is effectively stopped. This may prevent the user from demounting the tire, or, in the least require greater effort to pry the rim free.

SUMMARY OF THE INVENTION

It is an object of the present invention to provide an improved tire demounting tool.

In light of this object, the present invention generally provides a tire demounting tool for demounting a second bead of a tire from a rim having a flange, the tire demounting tool including a handle, a head extending radially outward as it extends axially outward from the handle, a bill extending axially outward from the head, where the bill includes a tip insertable between the second bead and the rim and wherein the head extends radially outward to the bill to capture the second bead when the bill is inserted between the rim and the second bead.

The present invention further provides a tire demounting tool for demounting a second bead of a tire from a rim having a flange, the tire demounting tool including a handle, a head extending radially outward as it extends axially outward from the handle, a bill extending axially outward from the head, wherein the bill includes a tip that is insertable between the second bead and the rim, and wherein the bill includes a first notch formed on the underside of the bill axially inward of the tip, and a second notch formed in the underside of the bill axially inward of the first notch.

The present invention further provides a tire demounting tool for demounting a second bead of a tire from a wheel rim including a handle, a head attached to the handle, the head including a forward section having a first radius and a neck portion having a second radius, wherein the first radius is greater than the second radius, and a bill extending axially outward relative to the forward portion, the bill being insertable between the second bead and the wheel rim.

DETAILED DESCRIPTION OF THE INVENTION

Figure 1:
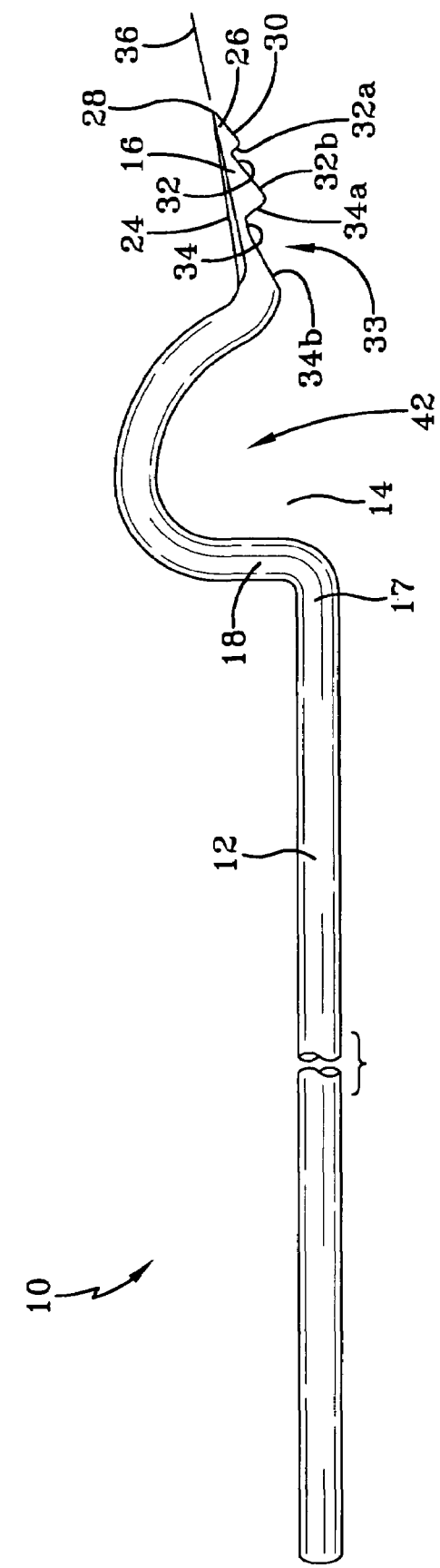
FIG. 1 is a side elevational view of a tire demounting tool according to the present invention.

A tire demounting tool according to the concepts of the present invention is depicted in the drawings and generally indicated therein by the numeral 10. Tire demounting tool 10 generally includes a handle 12, a head, generally indicated by the numeral 15, extending from handle 12 and a bill 16 extending from head 15. The bill 16 is insertable between a second bead $B_2$ of a tire T and a wheel rim W to pry the second bead $B_2$ over the flange F of wheel rim W to demount tire T from wheel rim W. It will be understood that a separate tool is used to demount the first bead $B_1$ of the tire T. It will be understood that reference to a first or second bead does not refer to a particular bead on the tire, but to the order in which they are removed to demount tire T from wheel rim W. Consequently, the first bead, $B_1$, is the first bead to be removed from wheel rim W. The second bead, $B_2$, is removed after first bead $B_1$ to completely release tire T from wheel rim W.

With reference to FIG. 1, tire demounting tool 10 is shown having an elongate handle 12 defining a longitudinal axis 14. Reference to the terms "axial" or "axially" will refer to extension along this axis or parallel to the longitudinal axis 14, however, it should be understood that these terms do not limit the handle 12 to being of a particular cross-section or limit the handle 12 to a linear shape. It will be understood that handle 12 may be formed with any cross-section and include variations from the linear shape shown in the drawings. For example, handle 12 may include an offset section or other deviation from the axis 14. The length of handle 12 may vary in accordance with the amount of leverage needed to remove the second bead from the wheel rim W. If necessary, extensions may be added to provide additional leverage.

The head 15 is attached to or formed integrally with the handle 12 and is generally located at one end of the handle 12. The head 15 extends radially outward as it extends axially outward from the handle 12 to form a neck portion or simply is neck 18 near the end 17 of handle 12. Eventually the head 15 reaches a radial outward extremity or crown 20 from which it extends axially outward and radially inward in a forward section 22 toward the bill 16. It will be appreciated that crown 20 may have any length, and may be a single point, as shown, or section connecting neck 18 to forward section 22. The bill 16 extends generally axially outward from forward section 22. As shown, bill 16 may have a generally flat top surface 24 that slides beneath the second bead $B_2$. Also, to facilitate insertion, the axial outer extremity or tip 26 may taper inwardly to form a thin edge 28 at the axial outer extremity of tool 10. As shown, the taper may be applied only to the lower surface 30 of tip 26. One or more notches 32 may be formed in the underside 33 of bill 16 axially inward of tip 26. Notch 32 receives flange F of wheel rim W therein to stabilize tool 10 and provide a fulcrum on flange F. In the example shown, a second notch 34 is provided inward of first notch 32. As shown, notches 32, 34 may have first and second walls $32a$, $32b$ and $34a$, $34b$ that define generally triangular notches. As shown, first wall $32a$, $34a$ of each notch 32, 34 may be oriented substantially perpendicular to second wall $32b$, $34b$. The first walls $32a$, $34a$ may be shorter than second walls $32b$, $34b$ and oriented at a steeper angle relative to axis 36 than second walls $32b$, $34b$ to facilitate insertion and resist forces that would force the tool 10 outward after insertion.

Figure 2:
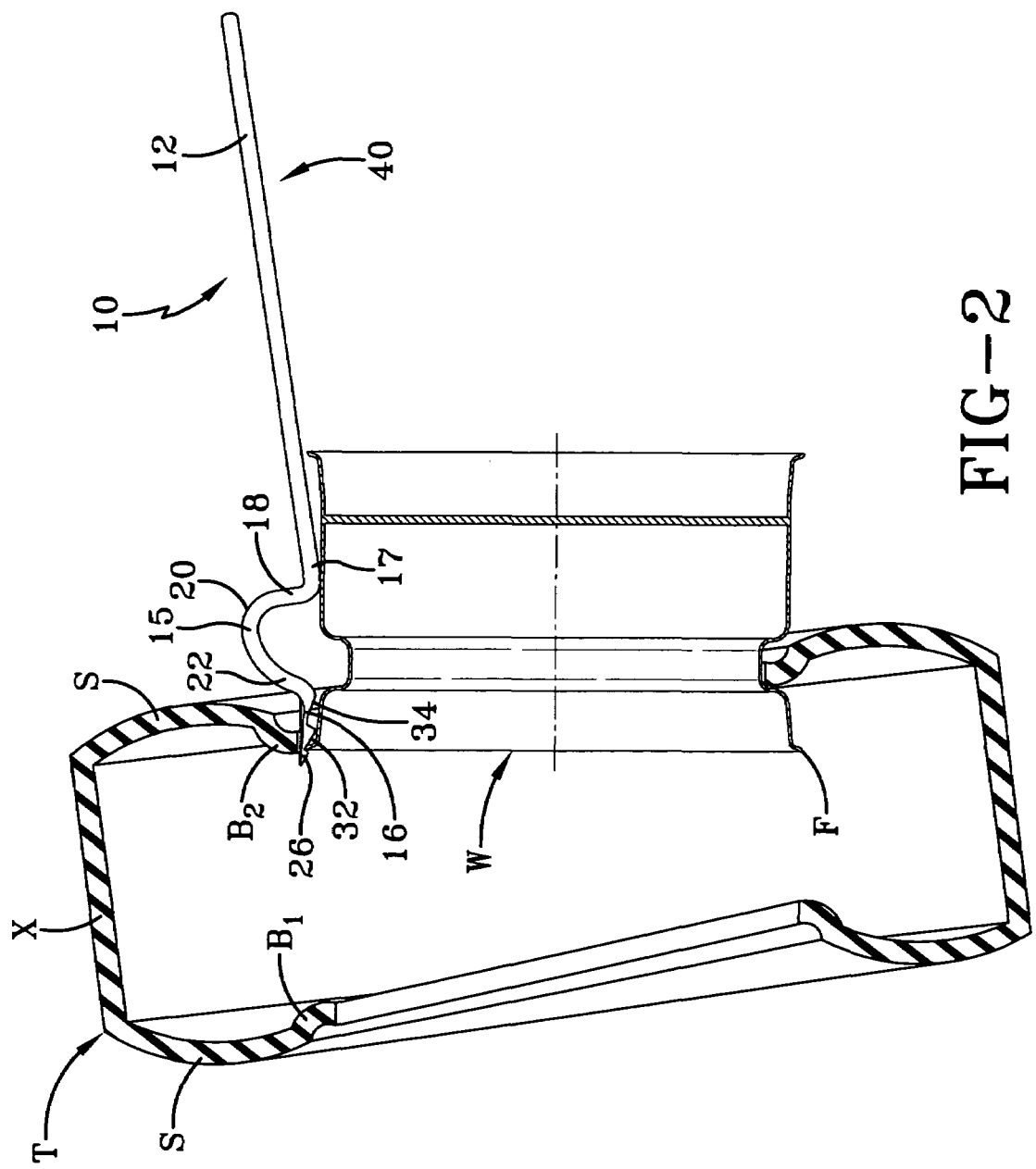
FIG. 2 is a partially schematic side elevational view depicting insertion of the tip of the tire demounting tool according to the concepts of the present invention between a rim and a second tire bead.

Bill 16 may extend outward from head 15 at any angle including horizontal. In the example shown, bill 16 slopes upward relative to axis 14 of handle 12. In other words, the bill 16 extends radially outward as it extends axially outward from head 15. As a result, when bill 16 is inserted horizontally between the second bead $B_2$ and wheel rim W, handle 12 extends upward relative to wheel rim W creating a clearance 40. As best shown in FIG. 2, this clearance 40 facilitates grasping of handle 12 and helps avoid any interference between handle 12 and wheel rim W that might hinder insertion of bill 16.

Figure 3:
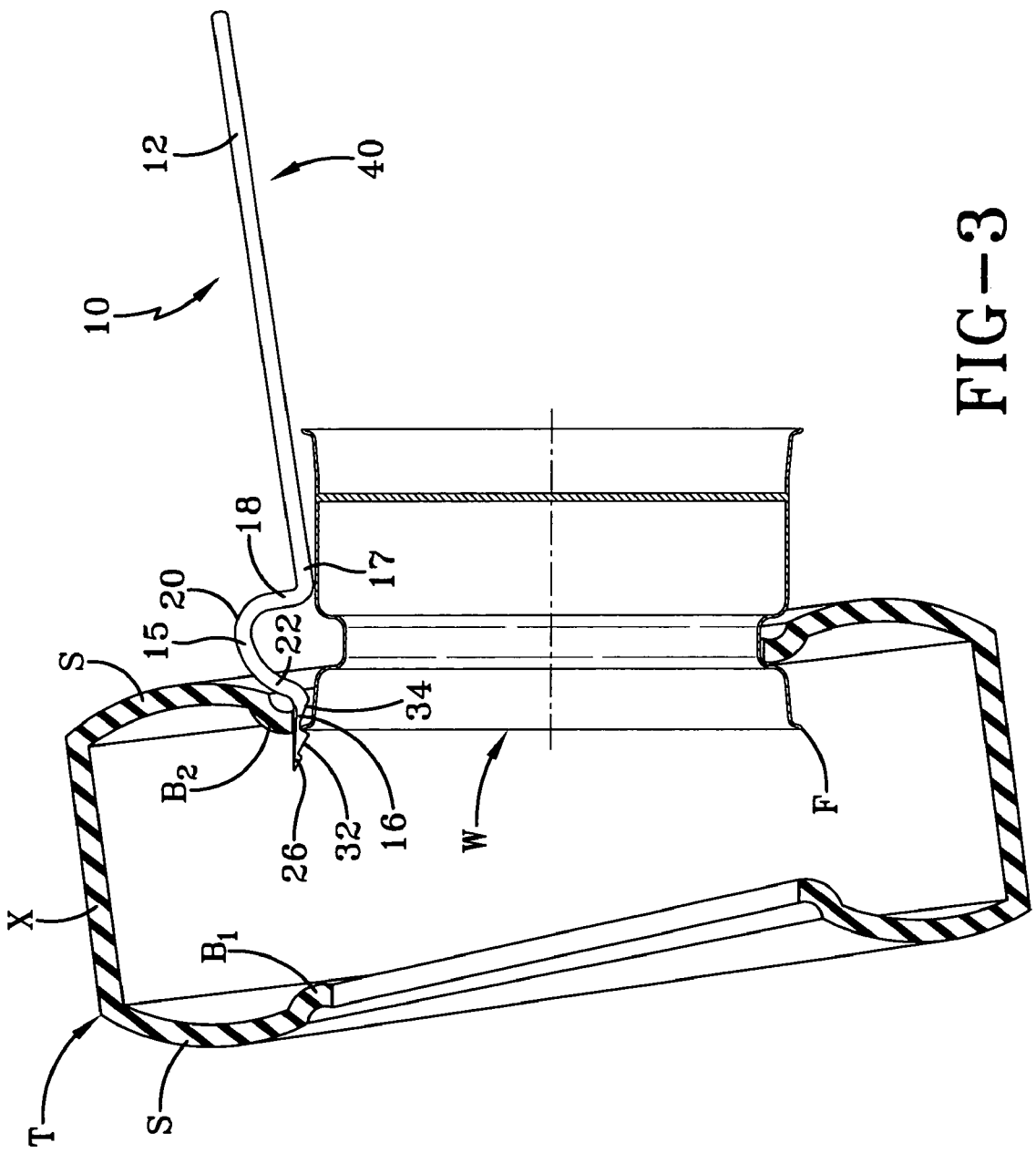
FIG. 3 is a partially schematic side elevational view similar to FIG. 2 depicting further insertion of the tip so that the flange of the rim resides in a second notch.

In operation, edge 28 is inserted between the second bead $B_2$ and tool 10 is oriented in a generally horizontal fashion with wheel rim W and tire T in an upright position resting on the tire's tread. As best shown in FIG. 2, the tool 10 is then driven forward causing the tip 26 to slip between the second bead $B_2$ and wheel rim W until flange F of wheel rim W is received in a notch 32. When using a tool having a second notch 34, as shown, the first notch 32 conveniently holds tool 10 until the user is ready to further insert the bill 16 between the second bead and the wheel rim W as shown in FIG. 3. In particular, with reference to FIG. 2, the second bead exerts a force against the bill 16 that holds the bill 16 against the wheel rim W with the flange F residing within notch 32. To further insert the tool 10, the user must press handle 12 downward and forward, using end 17 of handle 12, against wheel W, as a fulcrum raising bill 16 against second bead $B_2$, and then allowing bill 16 to slip inward to receive flange F in second notch 34 (FIG. 3). If additional notches are provided, this process would be repeated until the user has the flange F within the desired notch.

Figure 4:
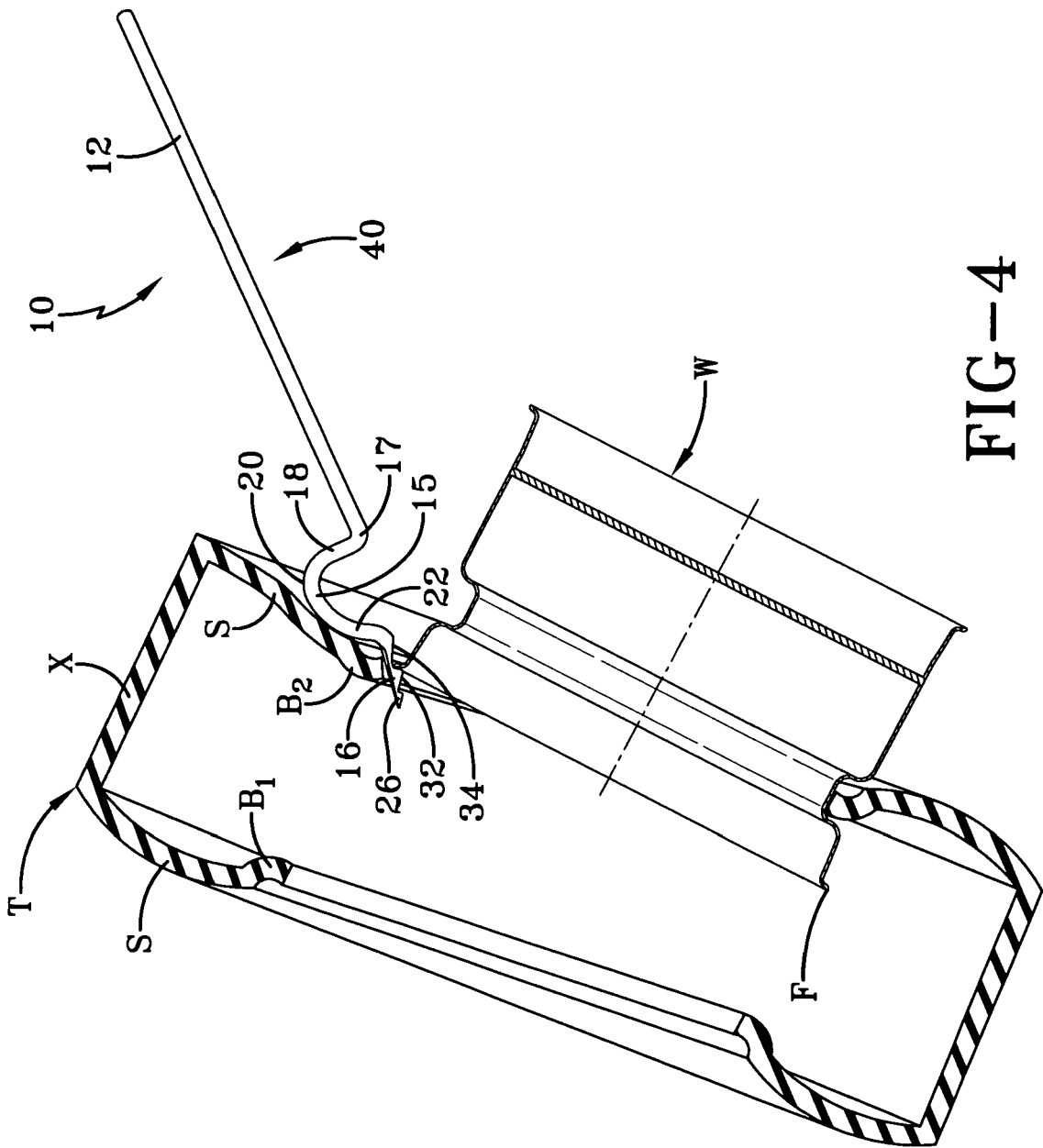
FIG. 4 is a partially schematic side elevational view similar to FIG. 3 depicting release of the second bead by operation of the tire demounting tool causing the rim to drop free from the tire.
Figure 5:
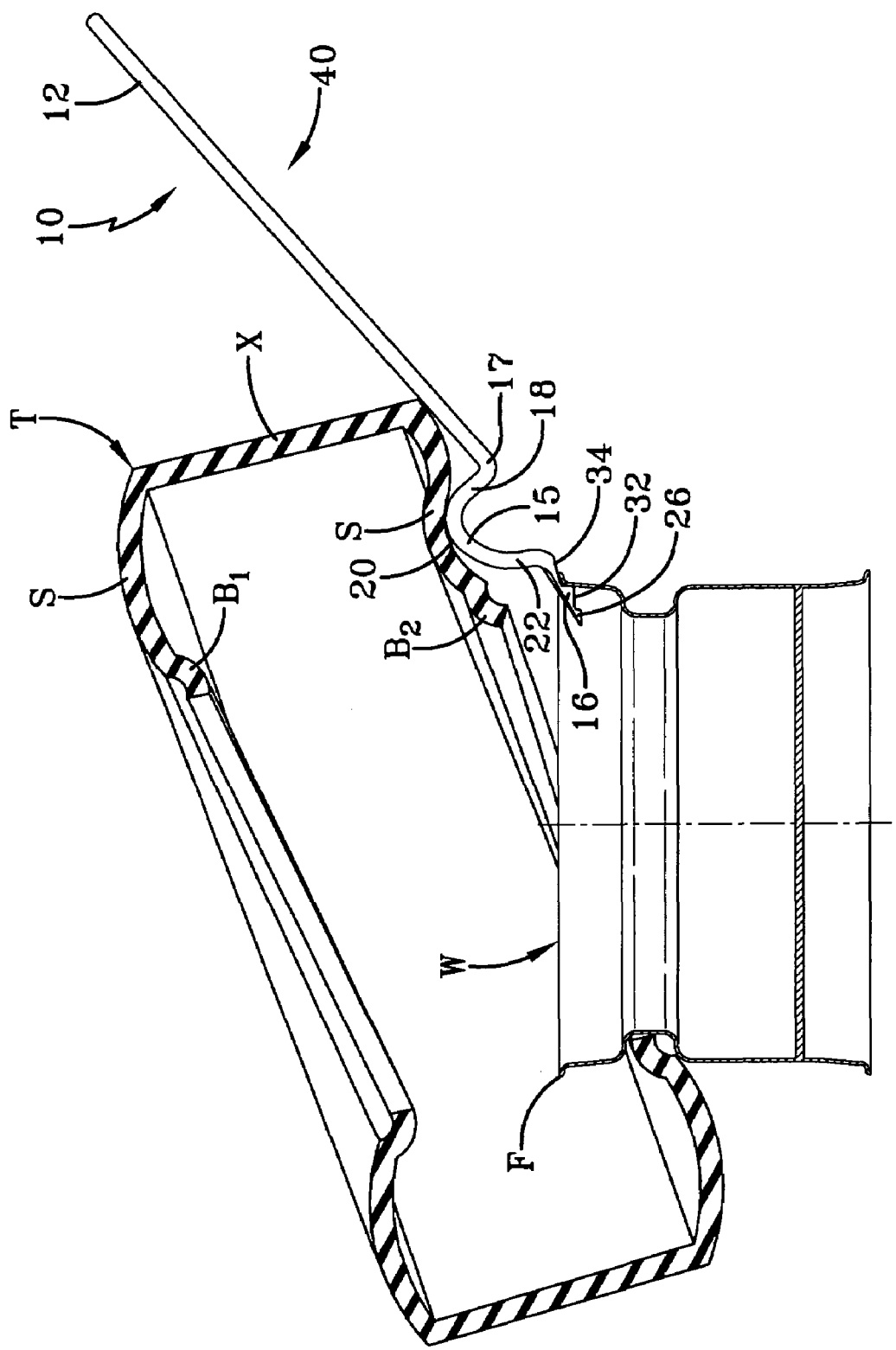
FIG. 5 is a partially schematic side elevational view depicting removal of the second bead of a tire by operation of a demounting tool according to the concepts of the present invention when the rim is supported on a surface.

In the example shown, with the flange F in second notch 34, the bead $B_2$ is captured by the forward section 22 of the head 15, which extends upward relative to the edge of the tire bead $B_2$ resting on the upper surface 24 of bill 16. As shown in FIG. 4, from this point, the user simply rotates the handle 12 upward away from wheel rim W to cause bill 16 to lift the second bead $B_2$ outward relative to flange F and release the wheel rim W. As the handle 12 is lifted upward, the forward section 22 of head 15 applies an inward force against the sidewall S and bead $B_2$ of the tire T to stretch the second bead $B_2$ over flange F. When starting from an upright position, wheel rim W may simply fall out from tire T after flange F is released from the second bead $B_2$ (FIG. 4). Alternatively, as shown in FIG. 5, after bill 16 is inserted, the user may lie wheel rim W flat on a supporting surface and rotate the handle 12 as described above to lift tire T off of wheel rim W.

The head 15 may be given generally any shape that extends radially outward relative to bill 16 to capture the second bead $B_2$ between head 15 and bill 16. Head 15 may be a solid piece. Alternatively, as shown, head 15 may be bent or otherwise formed to define an open recess 42. A curved shape may be used to contact sidewall S of tire T. For example, a semi-circular shape has been found suitable. Alternatively, as shown, a curved shape having multiple radii may be used to tailor the loading characteristics of the tool 10. In the example shown, the forward section 22 has a first radius R1 and the neck 18 has a second radius R2. As shown, the first radius R1 may be greater than the second radius R2 causing the neck 18 to rise more steeply from the handle 12 than the forward section 22 extends from the bill 16. In the example shown, the transition between the first radius R1 and second radius R2 occurs at the crown 20. The more gradual radius R1 is believed to assist the user by using the force exerted by tire T against the forward section 22 to hold tool 10 on wheel rim W as the handle 12 is rotated upward. Also, forward section 22 initiates movement of second bead $B_2$ over wheel rim W, with continued rotation of tool 10, crown 20 contacts the tire T and exerts a force against the sidewall S of tire T to lift the bead B₂ over rim flange F. The outward extension of the head 15 prevents the handle 12 from contacting the tire tread X as is common in existing tools. It will be appreciated that in existing tools, when the handle 12 contacts the tread, which is relatively incompressible, progress of the tool is effectively stopped making it extremely difficult to stretch the bead over the rim flange. In contrast, the head 15 of tool 10 only presses against the sidewall, which is more readily compressed giving the tool 10 an improved range of motion to stretch second bead B₂ over the flange F. As described above, the user may simply lift the handle and allow wheel rim W to drop free.

It should be apparent that the invention as described above satisfies the stated object, among others. It should further be understood that the preceding is merely a detailed description of a preferred embodiment of this invention and that various modifications and equivalents can be made without departing from the spirit or scope of the invention. The preceding description, therefore, is not meant to limit the scope of the invention. Rather, the scope of the invention is to be determined by the appended claims and their equivalents.

The invention claimed is:

1. A tire demounting tool for demounting a second bead of a tire from a wheel rim having a flange, the tire demounting tool comprising:
   a handle;
   a neck portion extending radially outward as it extends axially outward from the handle;
   a forward section extending radially inward as it extends axially outward, wherein said forward section attaches to said neck;
   a bill extending axially outward from said forward section, wherein said bill includes a tip insertable between the second bead and the rim and wherein said forward section extends radially outward relative to the bill to capture the second bead when the bill is inserted between the wheel rim and the second bead.

2. The tire demounting tool of claim 1, wherein said bill includes a notch formed on a lower side thereof said notch located axially inward of said tip.

3. The tire demounting tool of claim 1, wherein said bill includes a pair of notches formed on a lower side thereof axially inward of said tip.

4. The tire demounting tool of claim 1, wherein said bill has a generally flat upper surface.

5. The tire demounting tool of claim 1, wherein said forward section has a first radius and said neck portion has a second radius unequal to said first radius.

6. The tire demounting tool of claim 5, wherein said first radius is greater than said second radius.

7. The tire demounting tool of claim 6, wherein said first radius and said second radius meet at a crown.

8. The tire demounting tool of claim 1, wherein said handle has a longitudinal axis and said bill has a longitudinal axis, wherein said longitudinal axis of said bill slopes upward relative to said longitudinal axis of said handle.

9. The tire demounting tool of claim 1, wherein said neck and said forward section define a radially outward extending opening between said handle and said bill.

10. A tire demounting tool for demounting a second bead of a tire from a wheel rim having a flange, the tire demounting tool comprising: a handle, a head extending radially outward as it extends axially outward from the handle, a bill extending axially outward from the head, wherein the bill includes a tip that is insertable between the second bead and the rim, and wherein the bill includes a first notch formed on the underside of the bill axially inward of the tip, and a second notch formed in the underside of the bill axially inward of the first notch.

11. The tire demounting tool of claim 10, wherein said handle has a longitudinal axis and said bill has a longitudinal axis, wherein said longitudinal axis of said bill slopes upward relative to said longitudinal axis of said handle.

12. The tire demounting tool of claim 10, wherein said second notch is larger than said first notch.

13. The tire demounting tool of claim 10, wherein said first and second notches each have a triangular profile.

14. The tire demounting tool of claim 10, wherein said bill has a longitudinal axis, and wherein said notches each include a first wall and a second wall, wherein said first wall is oriented at a steeper angle than said second wall relative to said longitudinal axis of said bill.

15. The tire demounting tool of claim 14, wherein said first walls are shorter than said second walls.

16. A tire demounting tool for demounting a second bead of a tire from a wheel rim comprising:
   a handle;
   a head attached to said handle, said head including a forward section having a first radius and a neck portion having a second radius, wherein said first radius is greater than said second radius; and
   a bill extending axially outward relative to said forward portion, said bill being insertable between the second bead and the wheel rim.

* * * * *